Patented Sept. 22, 1953

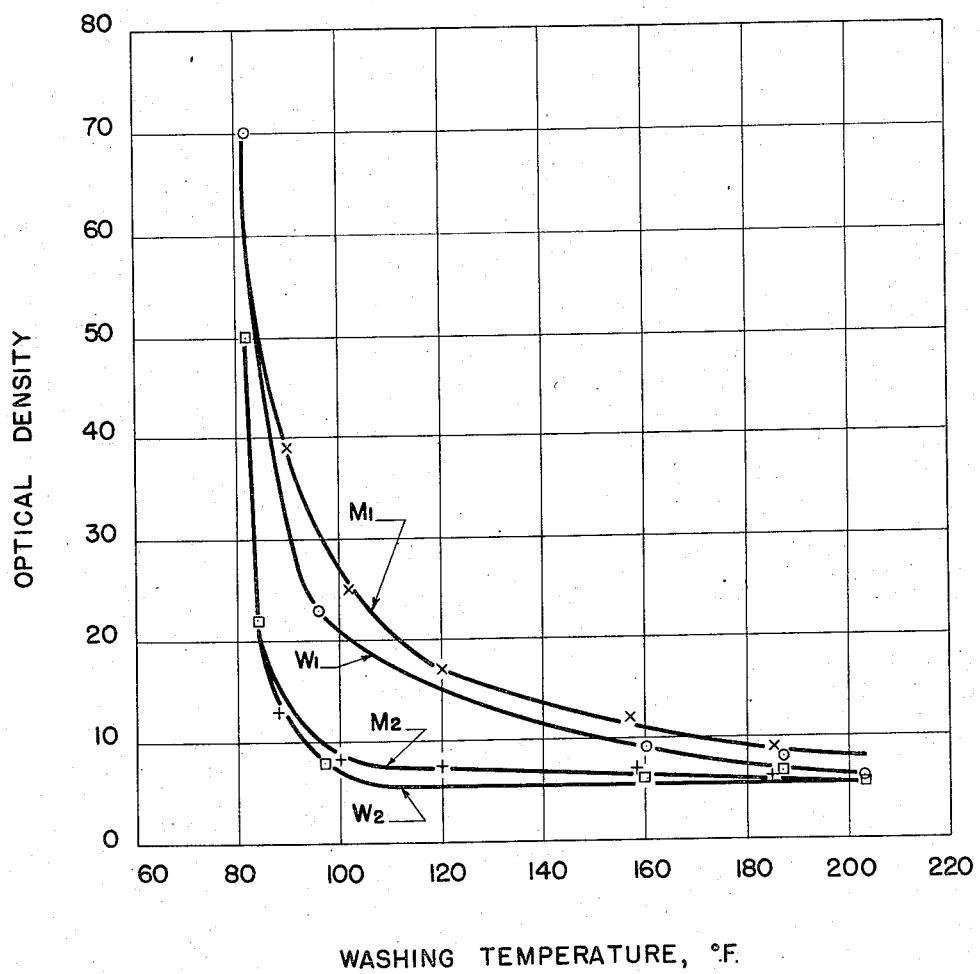

2,653,124

UNITED STATES PATENT OFFICE 2,653,124

PROCESS FOR SWEETENING HYDROCARBON OILS

Jack H. Krause, Hammond, Ind., assignor to Standard Oil Company, Chicago, Ill., a corporation of Indiana Application November 24, 1950, Serial No. 197,381

10 Claims. (Cl. 196—29)

This invention relates to an improved process for sweetening sour i. e., mercaptan containing, hydrocarbon oils. More particularly, it relates to improving the color stability of hydrocarbon oils which have been sweetened by the cupric chloride process. Still more particularly, it relates to the production of cupric chloride sweetened hydrocarbon oils that are color stable without the addition of copper metal deactivators thereto.

One of the widely used processes for removing the sour odor present in most naturally occurring hydrocarbon oils, especially those obtained by distillation of crude petroleum, is the so-called cupric chloride process. This process is described in detail in U. S. Patents Re. 20,938 and 2,042,051. Very briefly, the sour oil, for example, naphtha, gasoline, kerosene, heater oil, etc., is admixed with a substantially dry mixture of an adsorbent material and a copper salt which will provide cupric chloride. The adsorbent material may be fuller's earth or activated alumina. The life of the reaction mixture is prolonged by adding to the oil a free-oxygen containing gas, such as air or oxygen itself. The sweet oil is separated from the treating mixture and washed with water to remove suspended matter and some of the copper salt dissolved in the oil. The sweet oil and water are separated and the suspended and dissolved water removed from the sweet oil—usually by passing the oil through a rock salt drum.

It has been found that the sweet oil is not color stable, particularly at elevated temperatures. In the case of the light oils, such as naphtha and gasoline, this color instability is readily overcome by the addition of 0.0002–0.01 weight percent, based on oil, of a copper metal deactivator. Numerous classes of materials have been found which have this effect (Ind. and Eng. Chem. 41 (May 1949), p. 918). A good example of such copper metal deactivator is N,N' disalicylidine-1,2-diaminopropane. The usual dosage of this metal deactivator is 2 lbs. per 1000 bbls. of oil, i. e., about 0.001 weight per cent. However, it has been found that metal deactivators are relatively ineffective to stabilize the color of cupric chloride sweetened oils in the heavier-than-gasoline boiling range, such as diesel oil, range oil and heater oils.

It is an object of this invention to improve the conventional cupric chloride process for sweetening sour hydrocarbon oils. Another object is to produce a color stable sweet oil by the cupric chloride process. A further object is to produce a color stable oil without the addition thereto of copper metal deactivators. A specific object is to produce a color stable oil, boiling above the gasoline range, which has been sweetened by the cupric chloride process.

I have discovered that the color stability of an oil that has been cupric chloride sweetened is greatly improved by water washing the sweet oil at an elevated temperature. The color stability of the "hot water washed" oil with metal deactivator addition is remarkably improved relative to the normally sweetened oil. A satisfactory color stability is obtained when the cupric chloride sweetened oil is water washed at a temperature above about 155° F. and preferably above about 180° F. When metal deactivator is added to the oil sweetened according to my technique, the water washing should be carried out above about 100° F. and preferably above 110° F.

The sole figure in this application shows the effect of temperature in hot water washing of cupric chloride sweetened oils from two types of crude petroleum. All four curves in the figure are for sweetened heater oil, i. e., a distillate boiling between 350–650° F., obtained in one case from a very high sulfur West Texas crude (the W. curves) and a low sulfur Mid-Continent crude (the M. curves). In general, the sweetened oils to which my improved process applies will distill at atmospheric pressure within the range of 350–650° F.

In order to more precisely show the effect of my invention, color has been plotted in terms of optical density. The optical density system for color determination of oils has been described by Lykken in the October 1948 A. S. T. M. Bulletin, p. 68. The data presented in the figure were obtained using a Fisher Electrophotometer provided with a 425 Å. "B" filter, which is particularly suitable for the color variation in kerosene and heater oils. Optical density colors and the equivalent Saybolt and A. S. T. M.-Union colors are given below.

| Saybolt color: | Optical density |
|---|---|
| +30 | 0 |
| +22 | 3 |
| +16 | 5 |
| +13 | 7 |
| +8 | 10 |
| +4 | 12 |
| −2 | 16 |
| −8 | 20 |
| −16 | 26 |

A. S. T. M.-Union:

| 1 | 42 |
|---|---|
| 2 | 65 |

The data in the figure were obtained by sweetening the sour heater oil as follows: The catalyst was made by adding 1 part by weight of cupric chloride to 9 parts by weight of fuller's earth. This catalyst, substantially water free, was contacted with sour heater oil, to the extent of six volume percent based on the oil and the mixture stirred for about two minutes while the mixture temperature was maintained at about 115° F. The mixture was allowed to settle for about forty-five minutes and the treated oil separated. This procedure produced an oil that was sweet to the doctor test. The sweet oil was intimately contacted with water, about one volume of water to two volumes of oil normally, although more or less water can be used successfully, in a mixer; the washing operation was carried out at the denoted washing temperatures. The mixer contact time was usually about 50 seconds; however, from 30 seconds to 60 minutes contacting has been used successfully. The oil-water mixture was allowed to settle for about 10 minutes; the oil was separated and the suspended and dissolved water removed by a salt filter.

The color stability of the sweet oil was determined using an accelerated test wherein 100 milliliters of the oil in an open beaker are maintained at 200° F. for 20 hours. In order to measure the response of the sweet oil to copper metal deactivator, N.N' disalicylidine-1,2-diaminopropane was added to the extent of 0.001 weight percent, based on oil.

The W data were obtained using a heater oil from West Texas crude; this oil had been acid treated to produce a sour oil of 3 mercaptan number, and +22 Saybolt color. The M data were obtained using a Mid-Continent crude source which produced a sour heater oil of 6 mercaptan number and +22 Saybolt color. The subscript "1" represents the sweet oils without metal deactivator addition and subscript "2" represents the sweet oils with addition thereof.

A test was carried out with the West Texas sour oil wherein it was sweetened as above except for the water washing step. The sweet oil was washed with water, 50 volume per cent on oil, at 84° F. with a contact time of 6 minutes. The finished oil was aged in the accelerated test with and without metal deactivator.

The sweet, washed oil without metal deactivator addition on accelerated aging showed a —10 Saybolt color and a considerable amount of sediment formation. The oil with metal deactivator added showed an aged color of —8 Saybolt and no sediment formation.

Commercial experience indicates that a cupric chloride sweetened oil of the heater oil type will have an acceptable color stability if the accelerated aged color is +10 Saybolt color (9 optical density) or better.

The figure shows that an aged color of +10 Saybolt can be obtained by water washing the cupric chloride sweetened oil at a temperature of about 100° F. and adding about 0.001 weight percent of the metal deactivator. At a washing temperature of about 110° F., the beneficial effect apparently approaches a maximum, and the aged color of the "hot water" washed oil plus metal deactivator is substantially constant with increasing washing temperature.

The beneficial effect of hot water washing on the oil without metal deactivator is great even though not as remarkable as the hot water washed oil plus metal deactivator. A washing temperature of about 155° F. is needed to produce a borderline finished oil. However, at a washing temperature of about 180° F., the "hot water washed only" oil is very nearly equal in color stability to the water wash oil plus metal deactivator.

It is indicated that the effectiveness of elevated temperature water washing of the cupric chloride sweetened oil will continue to increase with temperature increase until a maximum point is reached. For the oils used herein this point appears to be about 220° F. or about the highest temperature of water that can be obtained without using superatmospheric pressures.

In a large scale test (8000 bbl./day) an M. C. heater oil feed of 6 mercaptan number was cupric chloride sweetened, water washed at about 110° F. and further stabilized by addition of 0.001 wt. percent of the metal deactivator to give a product oil of +13 Saybolt aged color. Using conventional water washing temperatures (ambient) satisfactory color stability was not obtainable. A heater oil of about 20 mercaptan number (a mixture of raw West Texas oil and Mid-Continent oil) has produced a satisfactory color-stable sweet oil when water washed at 160° F. and metal deactivator added.

While the data presented herein are on heater oil distillates, my invention is applicable to any hydrocarbon oil which can be cupric chloride sweetened (disregarding color stability) and any known copper metal deactivator can be used.

I claim:

1. The process of refining a sour hydrocarbon distillate oil which process comprises contacting said oil in the presence of gaseous oxygen with substantially dry cupric chloride on an adsorbent support, intimately contacting the treated hydrocarbon oil with liquid water in the absence of a material that is reactive with cupric chloride at a temperature of at least about 100° F. to effect a hot water washing, and adding to the washed hydrocarbon oil between about 0.0002 and 0.01 weight percent, based on the washed hydrocarbon oil, of a copper metal deactivator.

2. The process of claim 1 wherein the liquid water washing step is carried out at a temperature in excess of about 110° F.

3. The process of claim 1 wherein the treated hydrocarbon oil and the wash water are intimately contacted for a time ranging from about 30 seconds to about 60 minutes.

4. In the process of sweetening a mercaptan containing petroleum distillate boiling above the gasoline range wherein said distillate is contacted with a substantially dry mixture of adsorbent material and cupric chloride in the presence of added gaseous oxygen, separated from said mixture, intimately contacted with liquid wash water to remove suspended material, separated from the wash water, and stabilized with about 0.0002 to 0.01 weight percent, based on said finished distillate, of an added copper metal deactivator, the improvement which comprises carrying out the contacting of the wash water and treated distillate in the absence of a material that is reactive with cupric chloride at a temperature between about 100° and 220° F., for a time in the range of about 30 seconds to 60 minutes.

5. The process of claim 4 wherein the water washing step is carried out at a temperature of at least 110° F.

6. The process of claim 4 wherein the copper metal deactivator is N,N'disalicylidine-1,2-diaminopropane.

7. The process of refining a sour hydrocarbon distillate oil which process comprises contacting said oil with a substantially dry mixture of an adsorbent and cupric chloride in the presence of added free oxygen, separating the treated oil from said mixture, and intimately contacting the treated oil with liquid wash water in the absence of a material that is reactive with cupric chloride at a temperature in excess of about 155° F.

8. The process of claim 7 wherein the water contacting step is carried out at a temperature in excess of about 180° F.

9. In the process of sweetening a mercaptan containing petroleum distillate boiling above the gasoline range wherein said distillate is contacted with a substantially dry mixture of adsorbent and cupric chloride in the presence of added gaseous oxygen, separated from said mixture, intimately contacted with liquid water to remove suspended material and separated from said water, the improvement which comprises effecting the contacting of the water and distillate in the absence of a material that is reactive with cupric chloride for a period of time in the range of about 30 seconds to 60 minutes at a temperature in the range of about 155° to 220° F.

10. The process of claim 9 wherein the water contacting step is carried out at a temperature in the range of about 180° to 220° F.

JACK H. KRAUSE.

References Cited in the file of this patent

UNITED STATES PATENTS

| Number | Name | Date |
|--------|------|------|
| 2,302,352 | Schultze | Nov. 17, 1942 |
| 2,324,948 | Paulsen | July 20, 1943 |
| 2,503,627 | McBride et al. | Apr. 11, 1950 |